Patented Aug. 22, 1950

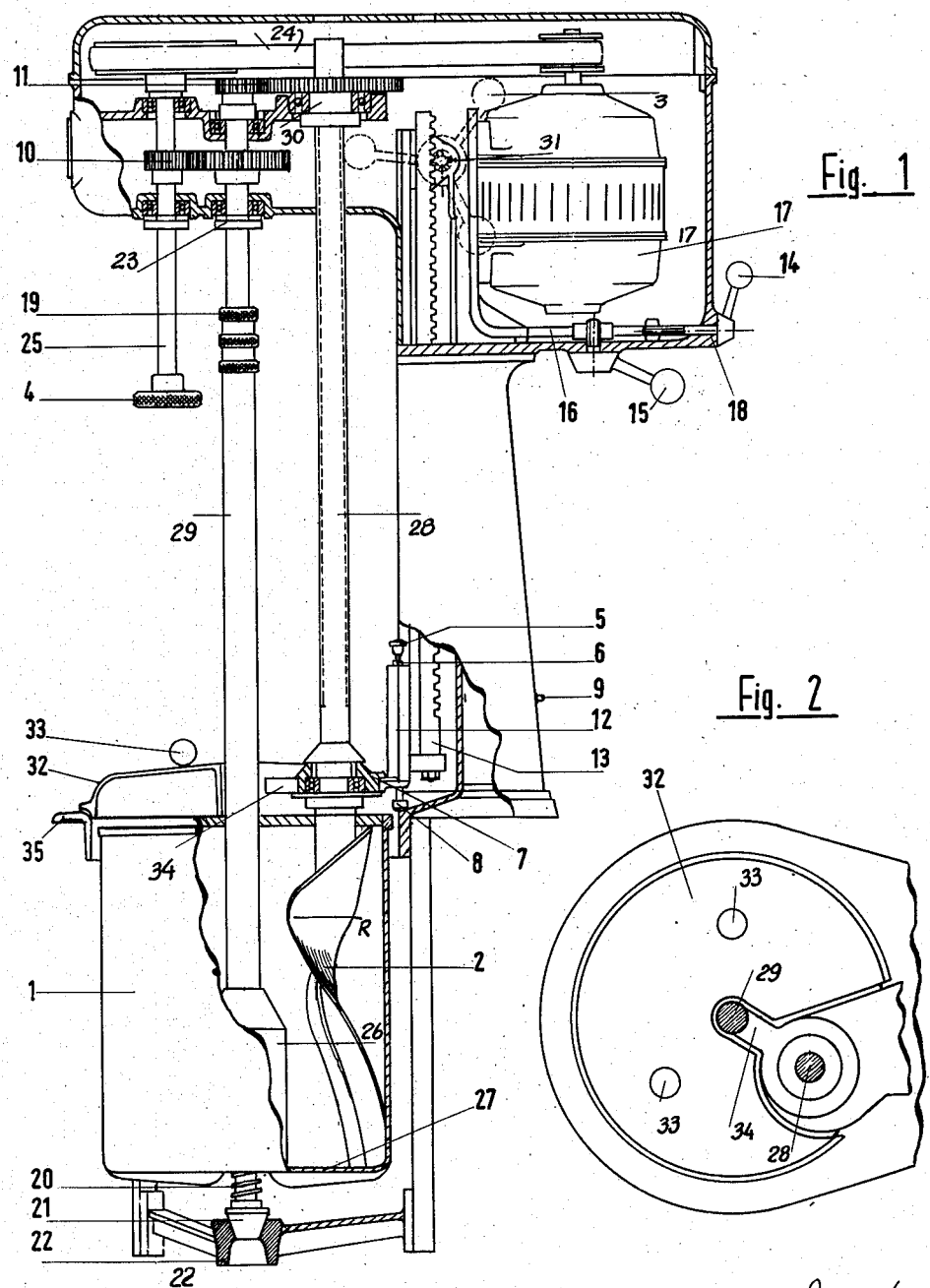

2,519,543

UNITED STATES PATENT OFFICE 2,519,543

MIXING AND SCRAPING MACHINE, ESPECIALLY ADAPTED FOR USE AS ICE-CREAM FREEZERS

Poerio Carpigiani, Bologna, Italy

Application July 20, 1946, Serial No. 685,253
In Italy July 28, 1945

3 Claims. (Cl. 259—85)

This invention has for its object a machine for the continuous mixing of dense, pasty or solid substances and particularly to machines in which substances possessing or acquiring a certain consistency are cooled at freezing temperature or heated to softening or roasting temperature. This for example is the case in ice-cream freezers, in which the ice-cream mixture, during its freezing, tends to adhere to the freezing can or also of nougats in which the sugar when burnt to caramel, tends to toughly stick to the heated walls and bottom.

The machines of this kind as employed up-to-date present a number of drawbacks. Generally the mixing and scraping member is moved forth and back and oscillated so as not to permit of closing the machine during its working. This drawback is often very detrimental, not only from a hygienic viewpoint as in this connection it is to be noted that the freezing compositions are subjected to be contaminated not only by the dust and other foreign substances, but also by the lubricating oil of the mixer, but also from the point of view of the manufacture and of the efficiency, as in the case of substances to be frozen the losses of cold are so high, as not to permit of manufacturing ice-creams during the hottest day hours, while in the case of substances to be heated during their mixing there is the tendency, e. g. of the sugar mass, to form at the surface a crust that does not further homogeneously mix to the underlying mixture, thus rendering the product inhomogeneous and consequently of inferior quality.

In order to overcome these drawbacks, rotary scrapers for ice-cream machines have also been proposed, but with unsatisfactory results, due to the necessity of giving a special shape to the can bottom, entailing a strong loss of capacity and the impossibility of thoroughly scraping the can walls (a part of which must be insulated) and resulting in a generally unsatisfactory quality of the product, due to the lack of the "whipping" effect of the ice-cream, which is due to the emulsionizing into the pasty mass of the cream of minute air bubbles rendering the product light, soft and/or friable, as the case may be, and much appreciated just for this quality.

This invention has for its object a machine of the kind above referred to, which may be closed during its working and which, beside eliminating the above mentioned inconveniences of the reciprocating machines, presents the advantage that it does not employ, as freezing cans, specially shaped vessels of reduced capacity and in which all the can walls subjected to cooling or heating are thoroughly scraped, thus overcoming the necessity of insulating a part of said walls. Another object of the invention is to permit of obtaining a whipping effect on the product.

Subordinately, the invention aims to provide a compact and completely enclosed construction, of such outer appearance, as to conform to the style of fashionable modern shops and in which the scraper can be extracted out of the can even during the working.

Other objects and advantages of the invention will appear from the following specification of a preferred embodiment of the machine, particularly designed for use as ice-cream freezer, but also adaptable, with suitable modifications, to other uses, as specified above.

Consequently, although for simplicity, in the following specification, the machine will be referred to as an "ice-cream freezer" (or straight out as a "freezer"), it is to be understood that this term shall not be understood in a limiting sense.

In the attached drawing:

Figure 1 is a side elevation with parts in section of the device and Figure 2 is a plan of the can closed by a cover.

As it results from the drawing, the freezer comprises the usual substantially cylindrical freezing can 1 to which a rotary motion is transmitted by shaft 29. The can may be rotated by hand-wheel 4 through gear pair 10 when limited angular shiftings are needed. However, during the manufacture of ice-cream, the can is operated electrically by means of motor 17 which through belt drive 24 drives shaft 25 carrying the handwheel 4. At its lower end, shaft 29 is fastened to hub 26 and ends in a cone 21 which is free to be shifted axially thereon. Spring 20 holds cone 21 pressed against a spider 22 of the fixed frame of the device. Thus little wearings of material are compensated.

It is to be noted, that in case of ice-cream freezers, the coldest can parts, which are cooled from the exterior by the brine, are the bottom 27 and hub 26. Within can 1 the mixer and scraper 2 is mounted on a shaft 28 provided with a keyway so as to be axially shiftable within hub 30 of one of the gears of gear pair 11 one of which is fitted on shaft 29 driven by the motor 17 through belt drive 24 and gear pair 10.

In the embodiment above referred to, the screw scraper 2 consists of a helical blade having such a shape that its helical edge contacts at the same time at least one point of the can wall, at least one point of the central hub and at least one point of the bottom of the can. This scraper, by revolving, thus describes with its edge a number of circles the diameter of which corresponds to the distance existing between the walls of hub 26 and the inner surface of can 1 while the lower end of the blade continuously sweeps over the flat or otherwise non-convex bottom of the can 1. Thus, the can revolves in one direction and the screw scraper revolves generally in the opposite direction and continuously scrapes the can wall and the surface of the hub 26 and also sweeps over the bottom 27. The screw scraper is rotated in unscrewing direction and thus it continuously lifts the ice cream and promotes its aeration. However, in order to avoid that the cream continuously pushed up tends to overflow, the screw scraper 2, at its top portion, beyond the point R, preferably reverses its pitch and thus it acts in screwing direction and pushes down the product lifted up beyond a certain height.

The screw scraper 2 may be lifted out of the can by rotating the control wheel 3 thus rotating the attached pinion 31 meshing with rack 13 attached to slide 12 supporting the screw scraper 2. This extraction is effected e. g. when it is desired to take out the ice cream or to remove the can from the machine. In this case the assembling sleeve 19 is removed by shifting same upwardly towards collar 23. Under said sleeve the shaft 29 is made in two parts connected by key and nut or like slidable connection. Thus, when the sleeve 19 is shifted upwardly, the upper part of shaft 29 remains fixed, while the lower part can be removed together with the can 1.

It is to be noted that, when the scraper is mounted, it can be adjusted axially by means of screw 5, which can be fastened in adjusting position by set nut 6, and radially by excentric 7 which can be maintained in adjusted position by screws 8.

In order to complete the description of the machine, it may be said that the tension of belt 24 is regulated by adjusting the position of motor 17 by means of control device 14 after loosing screw 15 which fastens to the casing 18 the motor-carrying slide 16—9 is the usual motor switch.

As it appears from the drawing, and particularly from Figure 2, the freezing can 1 can be closed during the ice-cream manufacture by means of a cover 32 provided with a radial cut and with handles or the like 33. The radial cut is shaped so as to be filled by the bracket part 34 of slide 12 in which the lower part of the screw scraper shaft 28 is mounted. The lid may be made also of transparent material, so as to permit of inspecting the product during its manufacture and it fits on to the usual fixed frame 35 encircling the upper border of freezing can 1.

As it is apparent, the invention might be embodied in many different ways, according to the particular uses, without departing from the spirit of its basic principle. Thus the shape of the screw scraper and of the freezing can may be subject to numerous changes and the driving mechanism may be modified in many ways, to suit to particular requirements.

I claim:

1. A mixer comprising a substantially cylindrical container, a motor-driven shaft fastened coaxially to a central cylindrical projection extending upwardly from the bottom of said container, a screw scraper blade projecting eccentrically into said container and having such a shape as to contact at any of its angular positions with at least one point of its edges with a point of the container walls, with at least another point with the cylindrical wall of said central projection of the container and with its lower edge with a portion of the container bottom; a rotatably driven shaft carrying said screw scraper, mounted parallel to said container-driving shaft, means adapted to axially displace said scraper-carrying shaft so as to shift said screw scraper into and out of the container, a motor and transmission means for driving both said shafts, and the container and scraper attached thereto, a fixed annular member encircling the upper edge of the container, a bracket-like member supporting the lower end of the scraper-carrying shaft, and a circular cover having a substantial sector-shaped cut-out removably fitted on said annular encircling member and accommodating within its cut-out the centrally positioned container driving shaft and said laterally positioned bracket-like member.

2. An ice-cream freezer comprising a fixedly mounted frame, a substantially cylindrical container rotatably carried by said frame, a rotatable shaft fixed co-axially to a central cylindrical projection extending upwardly from the bottom of said container, a second rotatable shaft mounted parallel to said first mentioned rotatable shaft in a position intermediate of the container walls and the said cylindrical projection, a cylindrical screw scraper rigidly connected to said second named shaft and contacting with its lower portion which performs a mixing, whipping and scraping action at any of its angular positions with at least one point of its edges with a point of the container walls, with at least another point of the cylindrical wall of said central projection of the container and with its lower edge with a portion of the container bottom, a motor and transmission means for rotating simultaneously the two rotatable shafts which rotate said container and said screw scraper respectively, said scraper being rotated in unscrewing direction of the lower mixing, whipping and scraping part, an axially sliding connection between the scraper-driving shaft and its driving means of said transmission, and means for shifting axially said scraper-driving shaft so as to shift said screw scraper in and out of the container.

3. A mixer comprising a substantially cylindrical container, a motor driven shaft fastened coaxially to a central cylindrical projection extending upwardly from the bottom of said container, a screw scraper projecting eccentrically into said container and having such a shape as to contact at any of its angular positions with at least one point of its edges with a point of the container walls, with at least another point with the cylindrical wall of said central projection of the container and with its lower edge with a portion of the container bottom, a rotatably driven shaft carrying said scraper mounted parallel to said container driving shaft, means adapted to axially displace said scraper carrying shaft so as to shift said screw scraper into and out of the container, a motor and transmission means for driving both said shafts so as to cause the said container to revolve about its own axis while the screw scraper revolves about its own axis within the rotating container, the means for shifting the screw scraper into and out of the container comprising a rack extending parallel to said shafts, means connecting the lower end of said rack to said scraper shaft, a slidable drive connection of said shaft with a rotatable member forming a part of said transmission means, a pinion in mesh with said rack, and manually operable means for rotating said pinion.

POERIO CARPIGIANI.

REFERENCES CITED

The following references are of record in the file of this patent:

UNITED STATES PATENTS

| Number | Name | Date |
|---|---|---|
| 393,043 | Twist | Nov. 20, 1888 |
| 957,088 | Petri | May 3, 1910 |
| 2,091,532 | Strong et al. | Aug. 31, 1937 |
| 2,127,777 | Kunzi | Aug. 23, 1938 |
| 2,240,641 | Dummler | May 6, 1941 |

FOREIGN PATENTS

| Number | Country | Date |
|---|---|---|
| 456,367 | France | Aug. 25, 1913 |